United States Patent
Grey et al.

(10) Patent No.: US 10,365,495 B2
(45) Date of Patent: Jul. 30, 2019

(54) DISPLAY SYSTEM

(71) Applicant: Wave Optics Ltd, Milton Park, Oxfordshire (GB)

(72) Inventors: David Grey, Maidenhead (GB); Sumanta Talukdar, Maidenhead (GB)

(73) Assignee: Wave Optics Ltd., Milton Park, Oxfordshire (GB)

( * ) Notice: Subject to any disclaimer, the term of this patent is extended or adjusted under 35 U.S.C. 154(b) by 0 days.

(21) Appl. No.: 15/541,942

(22) PCT Filed: Dec. 22, 2015

(86) PCT No.: PCT/GB2015/054114
§ 371 (c)(1),
(2) Date: Jul. 6, 2017

(87) PCT Pub. No.: WO2016/113528
PCT Pub. Date: Jul. 21, 2016

(65) Prior Publication Data
US 2018/0003994 A1 Jan. 4, 2018

(30) Foreign Application Priority Data
Jan. 16, 2015 (GB) .................................. 1500693.5

(51) Int. Cl.
*G02B 27/14* (2006.01)
*G02B 27/10* (2006.01)
*G02B 27/01* (2006.01)

(52) U.S. Cl.
CPC ..... *G02B 27/1086* (2013.01); *G02B 27/0101* (2013.01)

(58) Field of Classification Search
CPC ............ G02B 27/1086; G02B 27/0101; G02B 27/0172; G02B 2027/0178; G02B 2027/0132; G02B 2027/011
See application file for complete search history.

(56) References Cited

U.S. PATENT DOCUMENTS

2006/0132914 A1  6/2006  Weiss et al.
2010/0277803 A1  11/2010  Pockett et al.
(Continued)

OTHER PUBLICATIONS

International Preliminary Report on Patentability for PCT/GB2015/054114, dated Apr. 19, 2017.

*Primary Examiner* — Alicia M Harrington
(74) *Attorney, Agent, or Firm* — Stoel Rives LLP; R. Whitney Johnson

(57) ABSTRACT

A display system is disclosed for use in an augmented reality display (30), the system comprises a waveguide (32) having a front surface and a rear surface. A front input projector (34) projects polychromatic light through a front surface, and a back input projector (36) projects polychromatic light through the rear surface. Input light impinges on an input grating (38) on a rear surface of the waveguide (32), and light travels through the waveguide by total internal reflection. An output grating (40) is provided for coupling light out of the waveguide. A plurality of front and back input projectors (34, 36) are provided in a staggered configuration along the width of the waveguide (32) and respective edges of adjacent front and back input projectors are aligned along the width of the waveguide to permit a continuous projection of light.

12 Claims, 5 Drawing Sheets

(56) References Cited

U.S. PATENT DOCUMENTS

2011/0242661 A1* 10/2011 Simmonds .......... G02B 6/0035
359/567
2015/0016777 A1  1/2015 Abovitz et al.

* cited by examiner

DISPLAY SYSTEM

CROSS-REFERENCE TO RELATED APPLICATIONS

This application is a national stage application under 35 U.S.C. § 371 of International Application No. PCT/GB2015/054114, titled DISPLAY SYSTEM, filed Dec. 22, 2015, which claims priority to Great Britain Application No. 1500693.5, filed Jan. 16, 2015, all of which are hereby incorporated by reference in their entireties.

TECHNICAL FIELD

The invention relates to an augmented reality display or a head-up display. These displays allow a user to view their surroundings as well as projected images. In military or transportation applications the projected images can be overlaid on the real world perceived by the user. Other applications for these displays include video games and wearable devices, such as glasses.

BACKGROUND

In a normal set-up a transparent display screen is provided in front of a user so that they can continue to see the physical world. The display screen is typically a glass waveguide, and a projector is provided to one side. Light from the projector is coupled into the waveguide by a diffraction grating. The projected light is totally internally reflected within the waveguide. The light is then coupled out of the waveguide by another diffraction grating so that it can be viewed by a user. The projector can provide information and/or images that augment a user's view of the physical world.

A challenge exists in the production of wide-screen augmented reality displays because light from an input projector needs to be provided across the entire width of the display (if augmented reality is desired across the full width). One solution is to provide a single input projector with a pupil that extends across the full width of the display. This may require an expensive bespoke projector which is complex to manufacture. An alternative solution is to provide a smaller projector and optics that can expand the field of view across the width of the display. A disadvantage to this approach is that the expansion optics can take up significant space below the display. A further alternative is to provide several input projectors in parallel along the width of the display, which combine to produce the desired augmentation image. A disadvantage to this approach is that gaps between adjacent projectors can produce undesirable optical effects for a viewer.

FIG. 1 is a schematic diagram showing a wide screen augmented reality display 2 and a single input projector 4. Light is projected into a solid angle by each point in the input projector 2, which means that a field of view can be defined for each point. FIG. 1 shows fields of view 6, 8 created by points at opposite edges of the projector 4. The single input projector 4 would fail to project light over the full width of the display 2.

FIG. 2 is a schematic diagram showing the wide screen augmented reality display 2 with a plurality of input projectors 10, 12, 14, 16, 18, 20, 22. The projectors are positioned as close as possible to one another. However, the projectors' supporting structures means that there is a slight gap between the edges of adjacent projectors. The result is a gap between the fields of view of points at adjacent edges of neighbouring projectors. This gap can create undesirable optical effects from the perspective of a viewer. For example, the viewer may observe vertical striping in the display, especially if they change their perspective by turning or moving their head.

SUMMARY

An object of the present invention is to provide an improved augmented reality display, especially for wide-screen applications.

According to the present invention there is provided a display system for use in an augmented reality display, the system comprising: a waveguide which is a prism comprising a plurality of faces; a first input projector arranged to project light into the waveguide through a first face; a second input projector arranged to project light into the waveguide through a second face; at least one input grating configured to couple light from the first and second input projectors into the waveguide; and at least one output grating configured to couple light out of the waveguide towards a viewer.

By projecting light simultaneously through different faces of the waveguide it is possible to position the adjacent projectors very close together, along the width of the waveguide. This can reduce any gap between the fields of view of the projectors so that an augmented reality display can be more evenly illuminated across its width. This can improve the user experience of a wide augmented reality or head-up display screen.

Preferably the first and second input projectors are arranged adjacent to one another along a width of the waveguide, but on opposite sides. Preferably an edge of the first projector is substantially aligned with or overlaps an edge of the second projector, along the width of the waveguide. It would not normally be possible to achieve this arrangement by providing projectors on the same side of the waveguide because the projectors' supporting structures would necessitate a small gap. This gap can be reduced to zero by projecting light through different faces of the waveguide. In certain configurations an overlap between adjacent projectors may also be possible. This can provide even illumination across the width of the waveguide, which is advantageous for a wide-screen display.

Preferably the respective fields of view of the first and second input projectors are arranged so that there is substantially no gap between them, along at least one axis of the waveguide (preferably its width). Preferably, the fields of view of the respective input projectors are the solid angles into which light for the display system is projected. A field of view can be defined for each point on the respective input projectors. By aligning the edges there can be substantially no gap between the fields of view of points at the extreme edges of the adjacent projectors. This can improve the viewing experience for a user.

The first and second faces may be substantially parallel in the waveguide. In this way the waveguide can be used for total internal reflection, once the input light has been coupled in.

The first and second input projectors are preferably arranged on opposite sides of the waveguide. Preferably there is a plurality of first input projectors and a plurality of second input projectors arranged on successively opposite sides of the waveguide across its width. This staggered arrangement of input projectors can provide even illumination across the full width of the display.

Preferably the waveguide is tilted with respect to the light projected by the first and second input projectors. The angle of incidence of the respective light beams is therefore preferably tilted relative to the normal. Preferably the waveguide is tilted at an angle of around 70° relative to the viewing direction. Preferably the angle of incidence of light from the first and second input projectors is around 20° relative to the normal of the first input grating. It has been found that this arrangement can provide a full colour display in which all relevant wavelengths are successfully coupled into and out of the waveguide.

A first input grating may be provided to couple light from the first input projector into the waveguide and a second input grating may be provided to couple light from the second input projector into the waveguide. The first and second input gratings may be arranged respectively as reflective gratings for the light from the first and second input projectors. This can take advantage of the higher efficiency of reflective gratings for light from both the first and second input projectors.

In one arrangement there may be a first waveguide and a second waveguide. The first input grating may be configured to couple light from the first input projector into the first waveguide, and a first output grating may be configured to couple light out of the first waveguide towards a viewer. The second input grating may be configured to couple light from the second input projector into the second waveguide and a second output grating may be configured to couple light out of the second waveguide towards a viewer. Alignment of the first and second waveguide may be important to ensure that light from these waveguides can combine to produce the desired image.

In one arrangement a single input grating is arranged to couple light from the first and second input projectors into the waveguide. This arrangement can advantageously make use of a single waveguide. Preferably the single input grating is arranged as a reflective grating for light from the first input projector and a transmission grating for light from the second input projector (or vice-versa).

According to another aspect of the invention there is provided a display system for use in an augmented reality display, the system comprising: a waveguide which is a prism comprising a plurality of faces; a plurality of input projectors respectively arranged to project light into the waveguide through a first face or a second face, wherein the input projectors are arranged along a width of the waveguide, on successively opposite sides of the waveguide; at least one input grating configured to diffract light from the input projectors into the waveguide; and at least one output grating configured to couple light out of the waveguide towards a viewer.

BRIEF DESCRIPTION OF DRAWINGS

Embodiments of the present invention will now be described, by way of example only, with reference to the accompanying drawings in which.

DETAILED DESCRIPTION

Figure 1:
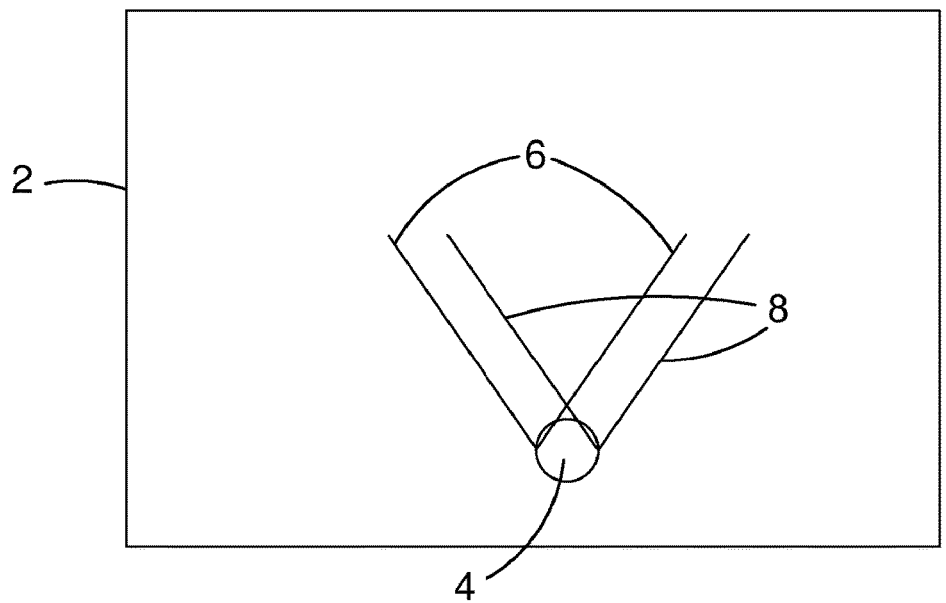
FIG. 1 is a schematic diagram showing an augmented reality display and a single input projector.
Figure 2:
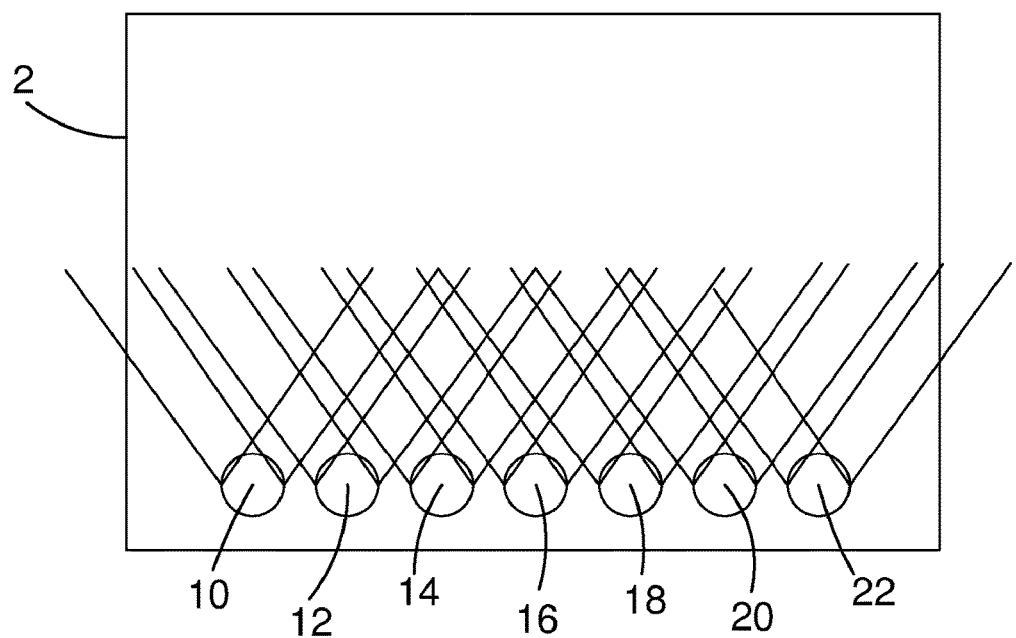
FIG. 2 is a schematic diagram showing an augmented reality display and a plurality of input projectors.
Figure 3:
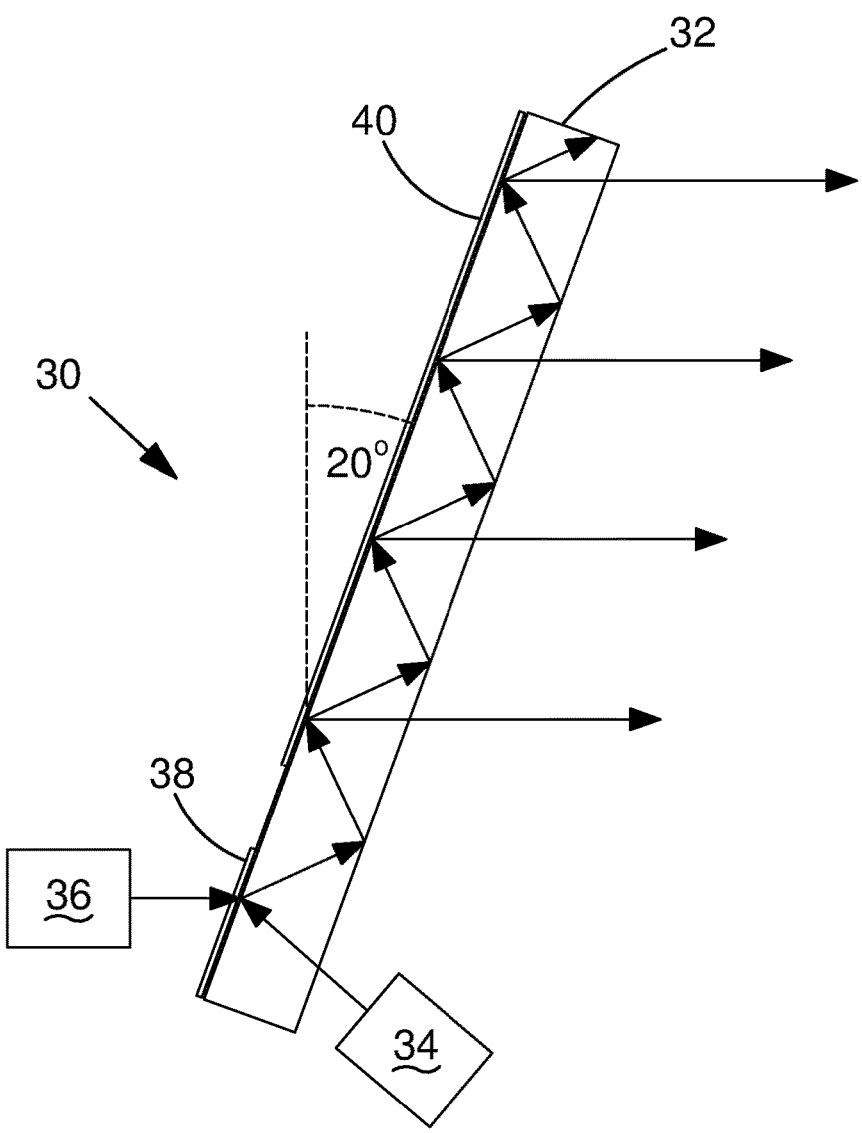
FIG. 3 is a side view of an augmented reality display in an embodiment of the invention.

FIG. 3 shows a side view of an augmented reality display 30. The display 30 comprises a glass waveguide 32, a front input projector 34, a back input projector 36, an input grating 38 and an output grating 40.

The front input projector 34 is arranged to project polychromatic light through a front surface of the waveguide 32. The light then impinges on the input grating 38 on a rear surface of the waveguide 32, which is parallel to the front surface. In this configuration the input grating 38 is reflective, and it diffracts light from the front input projector 34 into a plurality of orders. The waveguide 32 is arranged to totally internally reflect the first diffracted order. The diffracted light travels up the waveguide 32 towards the output grating 40. When the light encounters the output grating 40, which is also on a rear surface of the waveguide 32, it is diffracted once more. The output grating 40 is also reflective in this set up, and it diffracts light out of the waveguide 32 in the direction of a user.

The back input projector 36 is arranged to project polychromatic light through a rear surface of the waveguide 32 so that it impinges on the input grating 38. The input grating 38 operates in transmission for light from the back input projector 36 and it diffracts the input light into a plurality of orders. The waveguide 32 is arranged to totally internally reflect the first diffracted order. The diffracted light travels up the waveguide 32 and is coupled outward, towards a viewer, by the output grating 40, in the same manner as light from the front input projector 34.

The glass waveguide 32 is transparent so that the light from the front and back input projectors 34, 36 can be overlaid on light from the real world. The projected light can therefore be used to augment the user's perception of the real world by overlaying images and/or providing visual information.

The angles at which light from the front input projector 34 and back input projector 36 respectively impinge upon the input grating 38 are tilted relative to the input grating's normal. The input grating 38 diffracts light at an angle which depends on the wavelength of the incident light, the grating period, and the angle of incidence of incoming light. Since the input light is polychromatic it includes a plurality of wavelengths which are diffracted into different angles. This means that there is angular dispersion of light at different wavelengths, following diffraction. The orientation of the waveguide 32 relative to the input light beams is carefully controlled in order to ensure that total internal reflection is achieved for the full range of input wavelengths in the first diffraction order. In this set up the waveguide 32 is tilted at an angle of 20° to the vertical. The angle of incidence of light from the first and second input projectors 34, 36 is also tilted at an angle of 20° relative to the input grating's normal. In this configuration the period of the input grating 38 is 588 nm, although a different period may be preferred for different tilt angles to achieve a full-colour augmented reality display.

Figure 4:
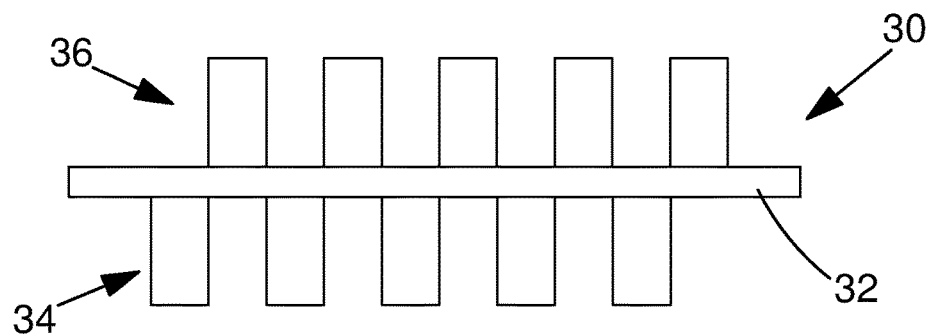
FIG. 4 is a plan view of the augmented reality display shown in FIG. 3.

FIG. 4 is a plan view of the augmented reality display 30. As can be appreciated the display 30 includes a plurality of front input projectors 34 and back input projectors 36, arranged in a staggered configuration along the width of the waveguide 32. The respective edges of the adjacent projectors 34, 36 are aligned along the width of the waveguide 32, which permits a continuous projection of light.

Figure 5:
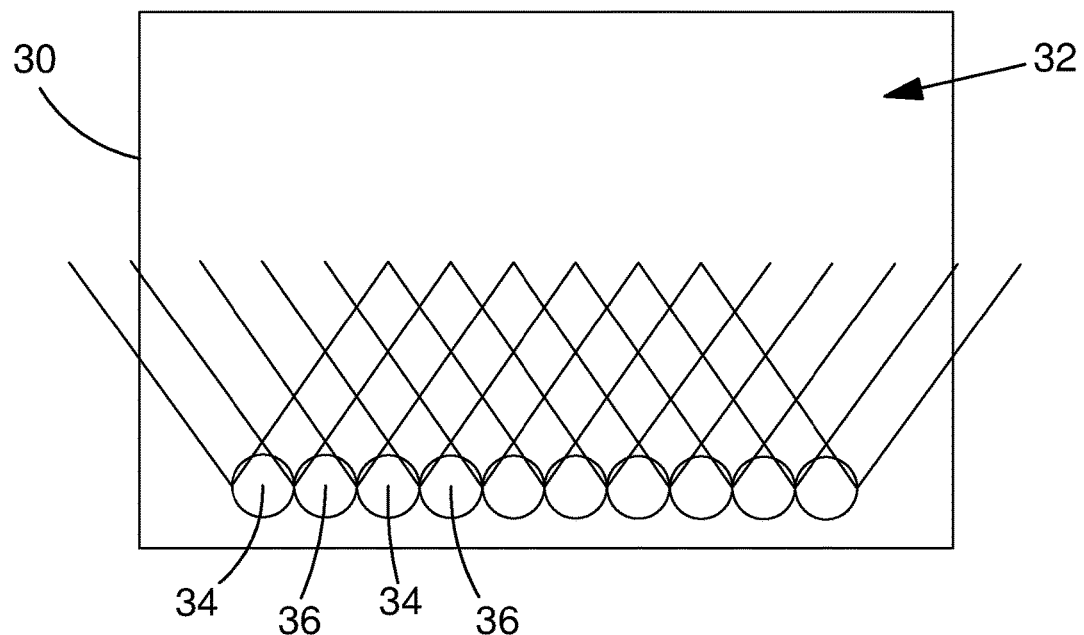
FIG. 5 is a schematic diagram showing an augmented reality display and a plurality of input projectors in an embodiment of the present invention.

FIG. 5 is a schematic diagram showing the augmented reality display 30 and front and back input projectors 34, 36, arranged along the width of the waveguide 32. As can be appreciated, front and back projectors 34, 36 are arranged alternately along the width of the waveguide 32. Thus, the field of view defined by a point on an edge of a front input projector 34 substantially overlaps with the field of view defined by a point on a neighbouring edge of a back input projector 36. This means that there are no gaps in the field of view across the width of the display 30, which permits more even illumination and an improved user experience.

Figure 6:
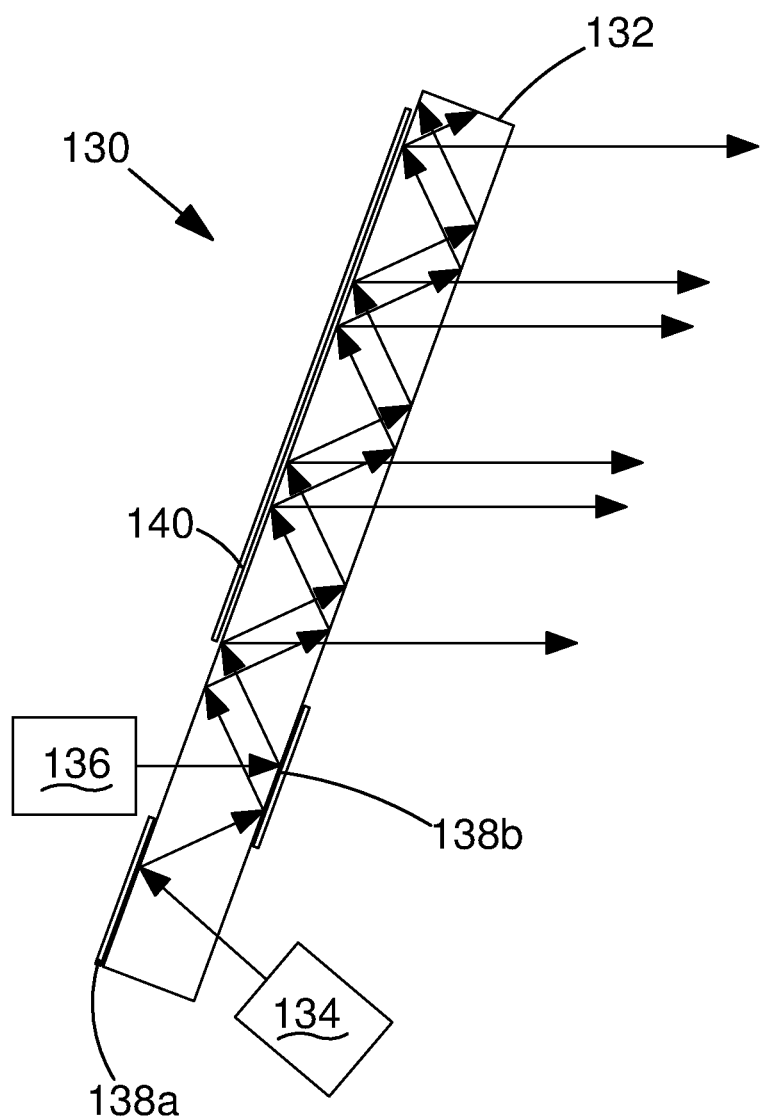
FIG. 6 is a side view of an augmented reality display in another embodiment of the invention.

FIG. 6 shows a side view of an augmented reality display 130 in another embodiment of the invention. In this arrangement front input projectors 134 are arranged in a staggered configuration with back input projectors 136 in the manner shown in FIG. 4. However, in this set up dedicated input gratings 138a,b are provided for the respective projectors 134, 136. This may be advantageous because input light is diffracted by the input gratings 138a,b in the same manner. Specifically, the input gratings 138a,b are arranged as reflective gratings, and light from the front and back input projectors 134, 136 must first traverse the interior of the glass waveguide 132 before it undergoes diffraction. This may provide a desirable symmetry for light from the front and back input projectors 134, 136. Additionally, reflective gratings typically operate with a higher efficiency, which can improve the viewing experience.

In the embodiment shown in FIG. 6, light from the front input projector 134 would undergo diffraction by its dedicated input grating 138a. However, this light would then be diffracted again when it impinges on the dedicated input grating 138b for the back input projector 136. This effect may require balancing to ensure that the front and back input projectors 134, 136 can combine to provide the desired images to a viewer.

Figure 7:
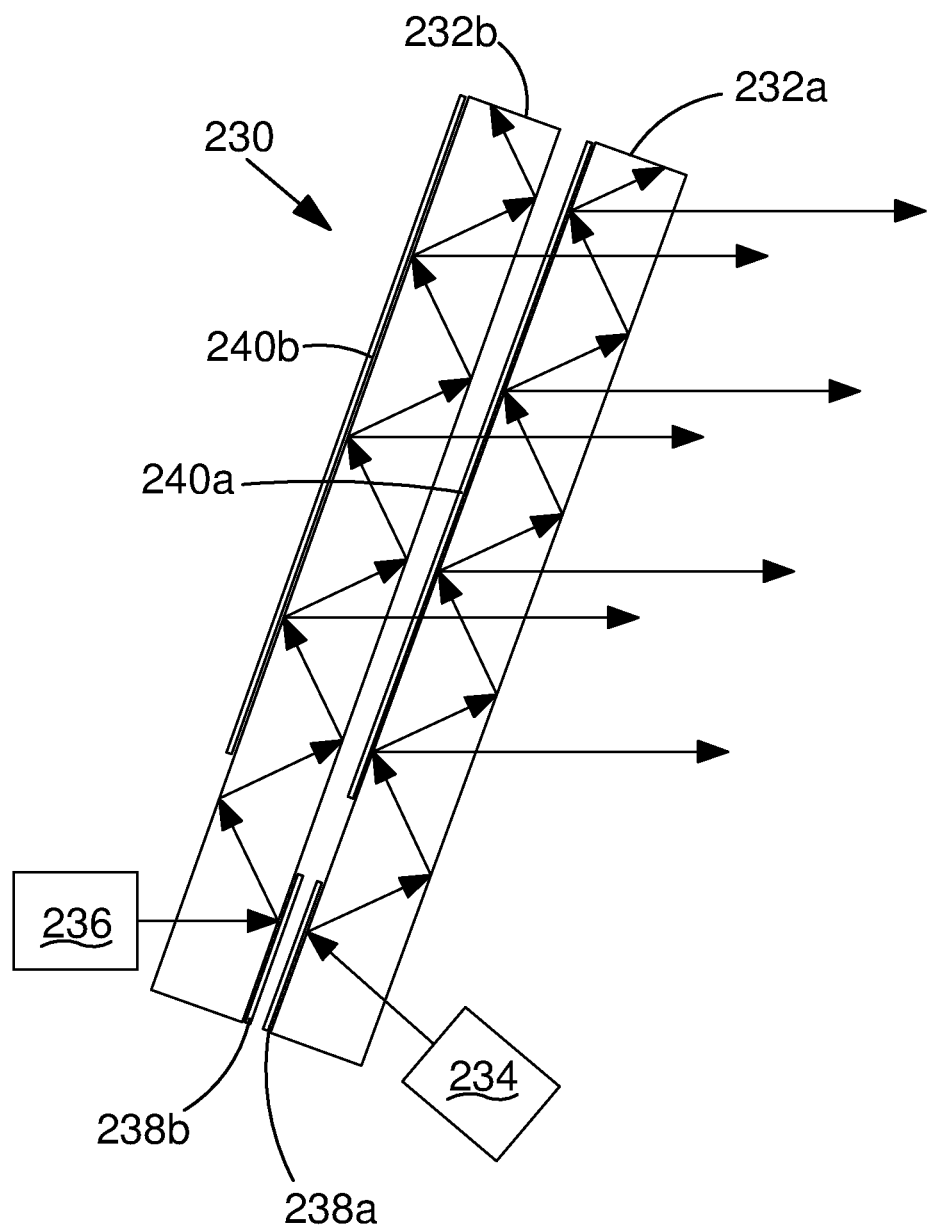
FIG. 7 is a side view of an augmented reality display in yet another embodiment of the invention.

FIG. 7 shows a side view of an augmented reality display 230 in another embodiment of the invention. In this embodiment separate waveguides 232a,b are provided for the front and back input projectors 234, 236. Each waveguide 232a,b has an input grating 238a,b arranged on a first face, which is opposite the face through which the front and back input projectors 234, 236 project light. Thus, the input gratings 238a,b are both reflective, and the light from the input projectors 34, 236 must first traverse the glass waveguides 232a,b before it is diffracted. This provides a desirable symmetry for the front and back projectors 234, 236. The waveguides 232a,b also include output gratings 240a,b on their back faces for diffracting light out of the waveguides 232a,b and towards a viewer.

The embodiment shown in FIG. 7 can provide high efficiency since all of the gratings 238a,b, 240a,b are reflective. Additionally, equal efficiency can be provided for light from the front and back input projectors 234, 236 because the light can follow near identical paths. The waveguides 232a,b may require accurate alignment in this embodiment to ensure that the images from the front and back input projectors 234, 236 combine as intended.

The invention claimed is:

1. A display system for use in an augmented reality display, the system comprising:
a waveguide comprising a plurality of faces;
a plurality of first input projectors arranged to project light into the waveguide through a first face;
a plurality of second input projectors arranged to project light into the waveguide through a second face wherein the first and second faces are substantially parallel in the waveguide;
at least one input grating configured to couple light from the plurality of first input projectors and the plurality of second input projectors into the waveguide; and
at least one output grating configured to couple light out of the waveguide towards a viewer,
wherein the plurality of first input projectors are arranged in a staggered relation to the plurality of second input projectors across a width of the waveguide, such that a first input projector is arranged adjacent to a second input projector in the direction of a width of the waveguide
to position respective fields of view of the first and second input projectors so that there is substantially no gap between them along the width of the waveguide.

2. The display system of claim 1, wherein the normal of the at least one input grating is tilted with respect to the light projected by the first and second input projectors.

3. The display system of claim 2, comprising a first input grating configured to couple light from the first input projector into the waveguide and a second input grating configured to couple light from the second input projector into the waveguide.

4. The display system of claim 3, wherein the first and second input gratings are arranged respectively as reflective gratings for the light from the first and second input projectors.

5. The display system of claim 4, comprising a first waveguide and a second waveguide, wherein the first input grating is configured to couple light from the first input projector into the first waveguide, and a first output grating is configured to couple light out of the first waveguide towards a viewer, and the second input grating is configured to couple light from the second input projector into the second waveguide and a second output grating is configured to couple light out of the second waveguide towards a viewer.

6. The display system of claim 3, comprising a first waveguide and a second waveguide, wherein the first input grating is configured to couple light from the first input projector into the first waveguide, and a first output grating is configured to couple light out of the first waveguide towards a viewer, and the second input grating is configured to couple light from the second input projector into the second waveguide and a second output grating is configured to couple light out of the second waveguide towards a viewer.

7. The display system of claim 2, wherein a single input grating is arranged to couple light from the first and second input projectors into the waveguide.

8. The display system of claim 1, comprising a first input grating configured to couple light from the first input projector into the waveguide and a second input grating configured to couple light from the second input projector into the waveguide.

9. The display system of claim 8, wherein the first and second input gratings are arranged respectively as reflective gratings for the light from the first and second input projectors.

10. The display system of claim 9, comprising a first waveguide and a second waveguide, wherein the first input grating is configured to couple light from the first input projector into the first waveguide, and a first output grating is configured to couple light out of the first waveguide towards a viewer, and the second input grating is configured to couple light from the second input projector into the second waveguide and a second output grating is configured to couple light out of the second waveguide towards a viewer.

11. The display system of claim 8, comprising a first waveguide and a second waveguide, wherein the first input grating is configured to couple light from the first input projector into the first waveguide, and a first output grating is configured to couple light out of the first waveguide towards a viewer, and the second input grating is configured to couple light from the second input projector into the second waveguide and a second output grating is configured to couple light out of the second waveguide towards a viewer.

12. The display system of claim 1, wherein a single input grating is arranged to couple light from the first and second input projectors into the waveguide.

* * * * *